United States Patent [19]

Boddicker

[11] 4,415,300
[45] Nov. 15, 1983

[54] TRANSPORTER-UNLOADER FOR LARGE CYLINDRICAL HAY BALES

[76] Inventor: Mark J. Boddicker, R.R. #2, Box 124, Walker, Iowa 52352

[21] Appl. No.: 304,343

[22] Filed: Sep. 22, 1981

[51] Int. Cl.³ .................... A01D 87/12; B60P 1/18
[52] U.S. Cl. ........................ 414/24.5; 298/20 R; 298/22 J; 414/484
[58] Field of Search ............ 414/24.5, 24.6, 436, 414/484, 485; 298/11, 15, 20 R, 20 A, 17 R, 17 SG, 19 R, 22 R, 22 AE, 22 J; 280/405 R, 405 B, 767

[56] References Cited

U.S. PATENT DOCUMENTS

| | | | |
|---|---|---|---|
| 2,698,199 | 12/1954 | Godbersen | 298/22 J |
| 2,761,730 | 9/1956 | Black | 298/11 X |
| 3,450,281 | 6/1969 | Groberg | 414/436 |

FOREIGN PATENT DOCUMENTS

| | | | |
|---|---|---|---|
| 1073218 | 3/1980 | Canada | 414/24.5 |
| 2026955 | 2/1980 | United Kingdom | 414/24.5 |
| 191364 | 2/1967 | U.S.S.R. | 298/20 R |

*Primary Examiner*—Leslie J. Paperner
*Attorney, Agent, or Firm*—Haven E. Simmons

[57] ABSTRACT

A transporter-unloader for large cylindrical hay bales features a main frame and a load frame, the load frame partially overlying the main frame and pivoted to the rear end of the latter frame. The rear end of each frame is equipped with a pair of wheels, and a scissors type hoist between the two frames raises the load frame relative to the main frame and at the same time elevates the rear end of the main frame relative to the ground.

5 Claims, 3 Drawing Figures

TRANSPORTER-UNLOADER FOR LARGE CYLINDRICAL HAY BALES

BACKGROUND OF THE INVENTION

Instead of into relatively small rectangular bales, hay nowadays is more and more bundled into much larger and heavier cylindrical bales, each four to five feet in length, perhaps five feet or so in diameter, and weighing from 1,000 to 1,500 pounds. Since the bales are scattered around the field they must be collected and hauled away. To that end typical practice is to use one or more tractors equipped with a fork lift or other bale mover device which picks up the bales one by one. Often the bales are also then individually transported by the tractor from the field to a storage or collection site and also unloaded one at a time. But since that tends to be very prodigal in terms of time and fuel, various bale transporters have been developed so that several bales can be loaded aboard and the group then pulled away to wherever desired.

Such transporters range from the very elaborate and thus costly shown, for example, in U.S. Pat. No. 4,204,790 which not only transports the bales but also loads and unloads them, to less elaborate and thus less expensive arrangements. Of the latter some merely transport and must be loaded and unloaded bale by bale. Others both load and unload, unloading occurring over the rear or off either side but in both cases with a tendency to scatter the bales rather than keep them neatly assembled on the ground. A few of those which unload also load, again from the rear or from the side, but these often tear the bales. All tend therefore to be not only less adept and adequate but also more costly and complex than they ought to be. So it is the chief object of the present invention to provide an efficient transport for hay bales of the kind described which both readily transports the bales as well as unloads them in a neat, well-defined row, yet can be economically constructed from readily available components.

SUMMARY OF THE INVENTION

The bale transporter-unloader of the present invention consists essentially of two frames, a relatively light main frame which is fitted for towing at its front end, and a longer, heavier load frame which supports the bales. The forward portion of the load frame overlies the main frame, the after portion of the load frame extending rearwardly of the main frame and equipped with a pair of wheels adjacent its rear end. The load frame is pivoted to the rear of the main frame so that the forward portion of the load frame can be elevated relative to the main frame, the wheels at the rear of the load frame forming a fulcrum with the ground. As a result, the rear of the main frame is also partially elevated about its front tow point. This manner of elevating the load frame lessens the distance between it and the main frame necessary in order that the load frame have sufficient inclination so that the bales will readily slide off the rear of the main frame as the transporter-unloader is moved forward. And that in turn means that a simple, readily available scissors type hoist of minimum stroke can be used between the two frames rather than a larger stroke ram and/or special linkage that would be required to provide the same elevation of the load frame were the main frame not also elevated at the same time.

The two frames are readily fabricated from everyday materials and since the weight of the bales is upon the load frame, which is supported at its rear by its wheels and at its front by the forward end of the main frame, the latter frame itself can be of relatively light construction. Preferably two pairs of wheels are employed, those at the rear of the load frame being supplemented by another pair at the rear of the main frame so that ordinary vehicle axle assemblies can be used and yet support multi-ton loads of bales. Other features and advantages of the invention will become apparent from the drawings and the more detailed description which follows.

DETAILED DESCRIPTION OF THE PREFERRED EMBODIMENT

Figure 1:
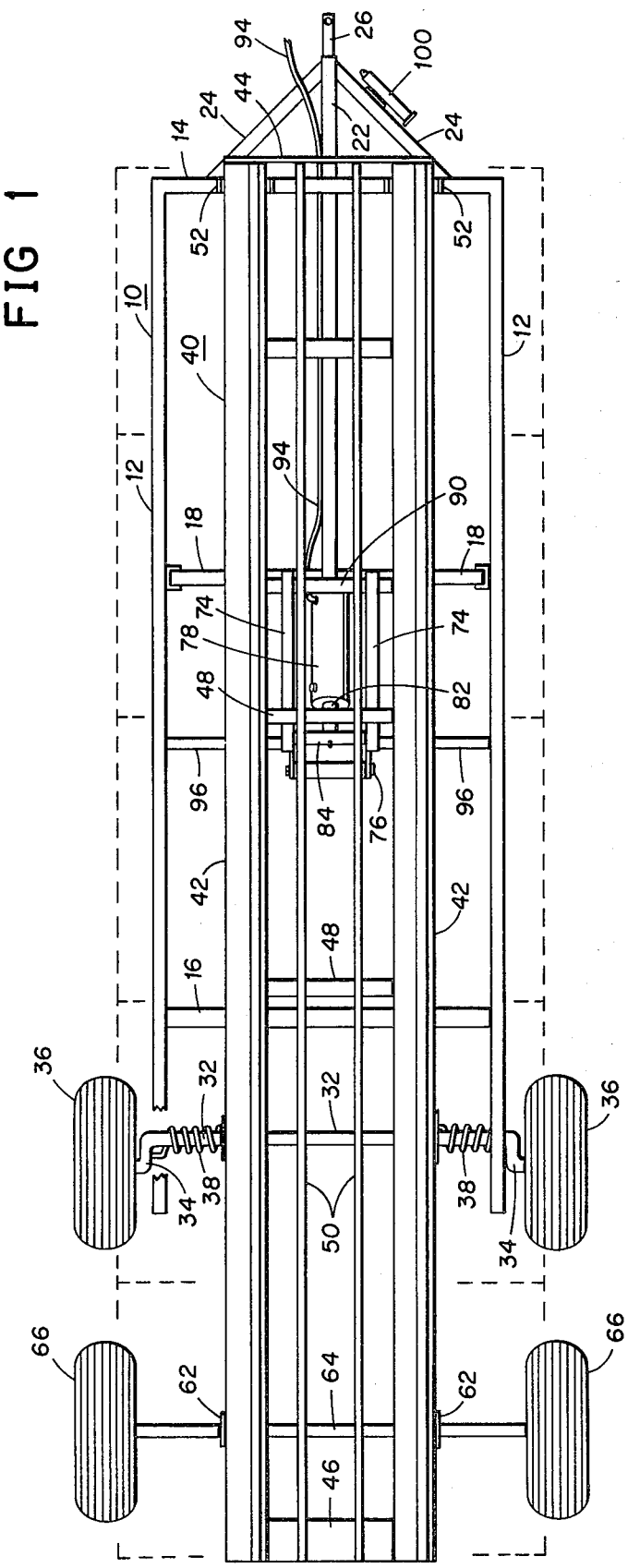
FIG. 1 is a top plan view of a hay bale transporter-unloader according to the invention shown in its transport position and loaded with a number of hay bales indicated in phantom lines.

The main frame 10 of the transporter-unloader consists of a pair of laterally spaced side members 12, extending longitudinally of the transporter-unloader, and joined at their front ends by a cross member 14 and forward of their rear ends by an underslung cross member 16. A second underslung cross member 18 joins the side members 12 intermediate their ends, the cross members 14 and 18 being joined in turn by a short longitudinal brace member 20. To the forward face of the front cross member 14 is attached the rear end of a forwardly extending tongue member 22 which is forwardly located by short diagonal brace members 24, the forward end of the tongue member 22 being fitted with an appropriate hitch 26 for attachment to the rear tow bar 28 of a suitable tractor. All of the foregoing members of the main frame 10 are joined by welds and may be cut from suitable round or rectangular material. To the undersides of the rear ends of the side members 12 is secured a transverse axle assembly 30 consisting of a axle bar 32 to the outer ends of which outboard of the frame side members 12 are journaled short trailing arms 34 on which are journaled in turn rubber tired wheels 36. Coiled torsion springs 38 interconnect the axle bar 32 and the arms 34 to provide a limited amount of sprung suspension for the main frame 10. A suspension of this nature is not essential and the reason it was employed on a working prototype is simply that an axle of this type happened to be "at hand", having come from an old fertilizer spreader.

Figure 2:
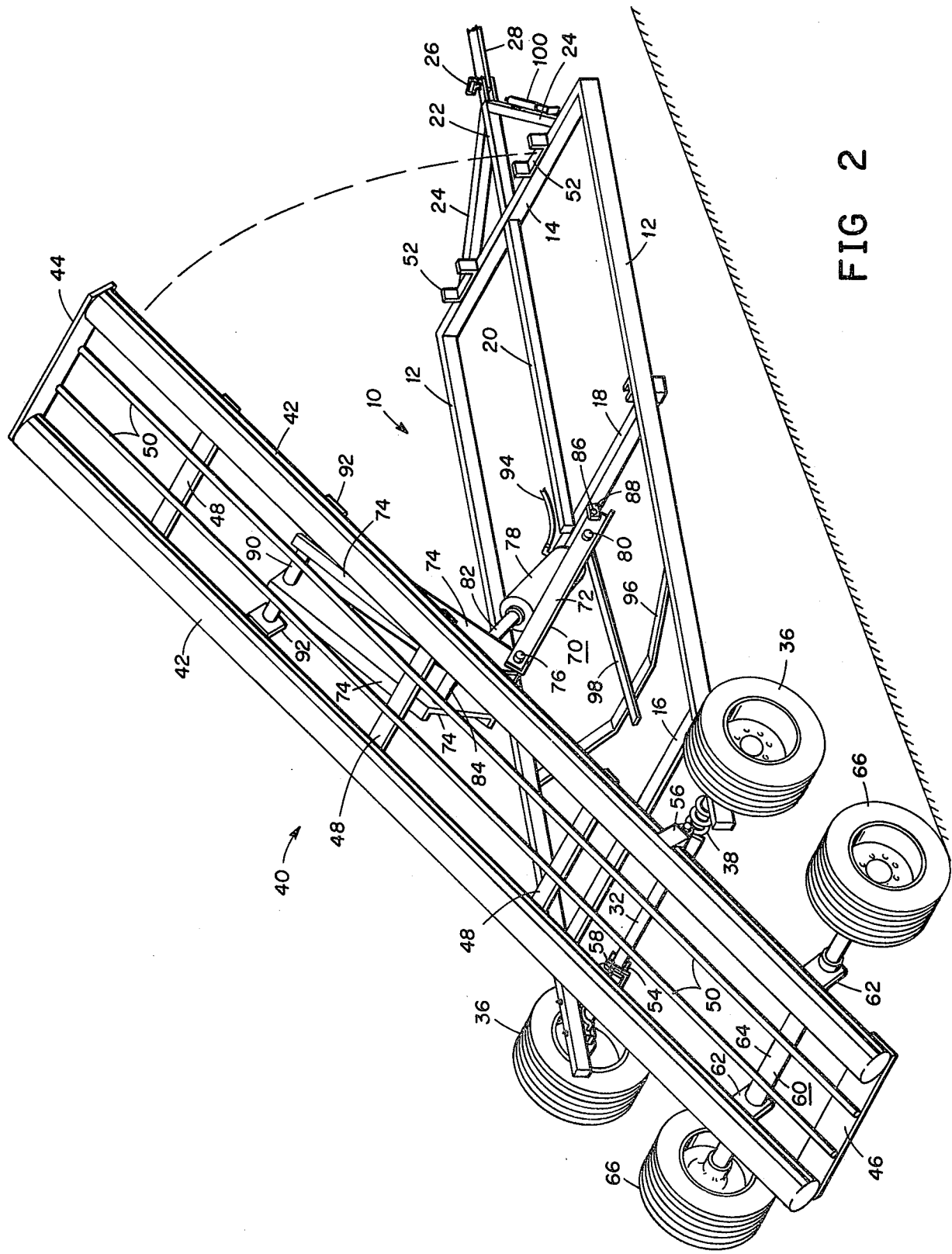
FIG. 2 is a perspective view illustrating the transporter-unloader of FIG. 1 in its unloading position.

The load frame 40 consists of a pair of longitudinal side members 42 laterally spaced from each other inboard of the main frame side members 12. A cross plate 44 joins the forward ends of the side members 42 and a second cross plate 46 joins the undersides of their rear ends. Intermediate cross bars 48 also join the undersides of the side members 42 and the cross plate 46 and cross bars 48 support a spaced pair of longitudinal bars 50 spaced between the side members 42. All of the foregoing are also secured by appropriate welds. As will be observed, a forward portion of the load frame 40 overlies the main frame 10, the forward ends of the two side members 42 being received in a pair of U-shaped brackets 52 welded atop the main frame front cross member 14. To the top of the axle bar 32 inboard of the springs 38 are welded a pair of transverse gudgeons 54 just below the load frame side members 42 and to the lower sides of the latter members are welded a pair of transverse knuckles 56, the latter and the gudgeons 54 being connected by hings pins 58 so that the overlying portion of the load frame 40 can be raised relative to the main frame 10 about the transverse axis provided by the hinge pins 58, all as shown in FIG. 2. Just forward of the rear ends of the load frame members 42 a second axle assembly 60 is secured to depending lugs 62, the axle assembly 60 consisting simply of a axle bar 64 to the outboard ends of which are journaled a second pair of rubber tired wheels 66 in tandem with the wheels 36. Here again, the axle assembly 60 for the prototype happened to be "at hand", having once been a part of an old hay crimper.

The load frame 40 is elevated by a typical scissors hoist 70 consisting of two pairs of laterally spaced arms 72 and 74, pivotally joined at their inner ends by a hinge pin 76, and a hydraulic cylinder 78. The closed end of the cylinder 78 is pivotally connected at 80 between the outer ends of the arms 72, the working end of its piston rod 82 being pivotally connected in turn at 84 between the arms 74 just beyond the hinge pin 76. The outer ends of the arms 72 are also pivotally connected at 86 to brackets 88 on the rear face of the adjacent main frame cross member 18 and the outer ends of the arms 74 are pivotally connected at 90 between a pair of depending lugs 92 from the load frame side members 42, whereupon operation of the cylinder 78 through the line 94 leading to the tractor's hydraulic system will open and close the hoist 70 and thus raise and lower the load frame 40. When the latter frame is in its lower or transport position atop the main frame 10, as shown in FIG. 1, the hoist 70 is supported on an underslung cross bar 96 between the main frame side members 12 which is braced by a longitudinal bar 98 extending forwardly to the main frame cross member 18 (see FIG. 2). In order to support the forward end of the transporter-unloader when not connected to a tractor, a standby, manually operated jack 100 may be attached to one of the main frame brace members 24.

Figure 3:
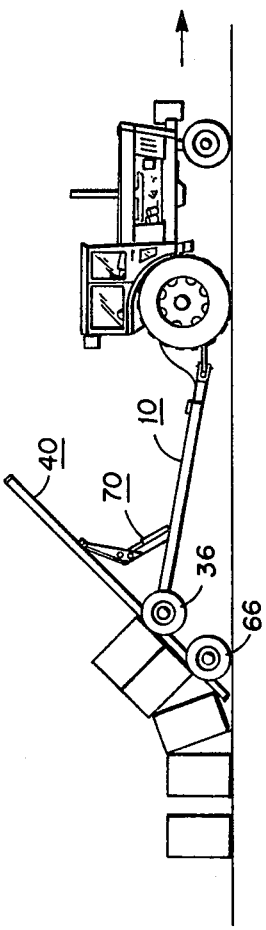
FIG. 3 is a diagramatic view showing the manner in which the bales are unloaded in a neatly stacked row on the ground as the transporter-unloader is driven forward.

When used, the transporter-unloader is drawn to the field by a tractor (or truck) attached to the hitch 26 and loaded with four to six bales (depending upon their size), all by another bale mover equipped tractor. Loading is accomplished from the rear end of the load frame 40, the bale being loaded pushing its predecessors forward along the frame side members 42. For this purpose, when a twin fork loader is used, the spacing of the side members 42 is such that the forks of the loader can straddle the rear end of the load frame 40. Owing to the sprung axle assembly 30 in this instance, the main frame wheels 36 alone support the transporter-unloader when empty, the load frame wheels 66 remaining off the ground until the weight of the loaded bales depresses the main and load frames 10 and 40 enough to engage the load frame wheels 66 with the ground, both pairs of wheels 36 and 66 thereafter supporting the load. It will be observed from FIGS. 1 and 3 that the bales when loaded are arranged end-to-end along the main frame 40 so that when later unloaded the bales slide off the rear ends of the load frame side members 42 onto the ground in a neat end-to-end row as diagramed in FIG. 3. To unload, of course, the hoist cylinder 78 is activated, thereby unfolding the hoist arms 72 and 74 and elevating the overlying portion of the load frame 40, as shown in FIG. 2, about its hinge pins 58. At the same time the rear end of the main frame 10 and its wheels are also elevated, the main frame 10 pivoting about the hitch 26 and the hinge pins 58, thus decreasing the span through which the hoist 70 must operate were the main frame 10 to remain stationary. Note that since the main frame 10 does not extend back to the load frame wheels 66, it need not be as heavy as it would have to be in that case in order to withstand the forces imposed upon it by the hoist 70 when the load frame 40 is elevated. Note, too, that by locating the hinge pins 58 more forwardly on the load frame side members 42 not only is the necessary operating span of the hoist 70 reduced for a given angle of inclination of the load frame 40 but the stress on the main frame 10 is also reduced, whereby the latter frame can be made even lighter and/or shorter. And finally note that the weight of the bales being transported is borne entirely by the very forward end of the main frame 10, through the brackets 52, and the wheels 36 and 66, thus also obviating the need for heavy construction of the main frame 10.

As the load frame 40 is elevated its wheels 66 remain on the ground and the rear end of the load frame 40 swings down closely adjacent the ground so as to provide a smooth path for the descending bales as the transporter-unloader is moved forward by the tractor. Though others may also be usable, about a 45° angle of inclination of the load frame 40 relative to the ground has been found practical for the foregoing purpose and is easily within the operating range of readily available scissor hoists. The load frame wheels 66 allow the transporter-unloader to be moved forward as it is unloaded and are spaced widely enough to give sufficient side stability when the load frame 40 is elevated since with the bales on it is is fairly top-heavy. If desired, the location of the hoist 70 along the frames 10 and 40 can be made adjustable so that other angles of inclination can be achieved, indeed, so that the load frame 40 could even be raised to a near vertical position and the bales thereby unloaded in a vertical stack, instead of in a row, on the ground. In order to accommodate a vertical position of the load frame 40, an alternate, more rearward location for the rear axle assembly 60 would have to be provided so that the wheels 66 would remain in contact with the ground to steady the load as well as to allow the transporter-unloader to be moved in either direction with the load frame 40 so elevated. By equipping the rear ends of the load frame side members 42 with a pair of removable forks, the load frame 40 when in a vertical position can be used to pick-up a vertical stack of bales on the ground by backing up the transporter-unloader, much in the manner of a fork lift truck, to engage the forks beneath the stack and then reclining the load frame 40. There are still many instances where hay bales can advantageously be stored in stacks under cover rather than left in rows out in the open.

In the working prototype previously referred to the main frame 10 between the front cross member 14 and the axle assembly 30 is about $8\frac{1}{2}'$ in length and about 5' in width, being made up of $2'' \times 4'' \times \frac{3}{8}''$ tubing. The load frame 40 is about 3' in width and its side members 42 are $6'' \times \frac{3}{8}''$ tubing 20' in length. The distance between the hinge pins 58 and the rear end of the load frame 40 is about 6'. The axle assemblies 30 and 60 happen to have 6 and 4 ton ratings respectively and are spaced about 4 feet apart, though axle assemblies of lesser rating could be used since the loaded weight of the bales is divided between the two. The location of the axle assembly 60 relative to the rear end of the load frame 40 should be such that when the latter is elevated its rear end closely abuts the ground so the bales are not scattered as they unload, as would tend to be the case were they to fall any appreciable distance from the load frame 40. That location thus depends upon the diameter of the wheels 66 and the normal inclination of the load frame 40. In any event, for the reasons earlier given, the rear of the load frame 40 should not be allowed to engage the ground at the expense of the mobility and stability provided by the wheels 66. The hoist 70 may have a 4 to 6 ton rating and its pivots 86 and 90 to the main and load frames 10 and 40 are each about 8′ forward of the axle assembly 30 to provide a 45° inclination of the load frame 40.

Though the invention has been described in terms of a particular embodiment, being the best mode known of carrying out the invention, it is not confined to that embodiment alone. Instead, the following claims are to be read as encompassing all adaptations and modifications of the invention falling within its spirit and scope.

I claim:

1. A transporter-unloader for large, generally cylindrical hay bales of the kind described comprising: a longitudinally extending and rigid main frame having front and rear ends, the front end being adapted for connection to tractor means; a longitudinally extending load frame for carrying said bales having front and rear ends, a forward portion of the load frame longitudially overlying and supported by the main frame, an after portion of the load frame extending aft of the rear end of the main frame, the load frame being pivotally connected to the main frame about an axis transverse with respect to both frames, said axis being disposed adjacent the rear end of the main frame and between said forward and after portions of the load frame effective so that the load frame may be raised from a bale transport position to selected inclined bale unloading positions relative to the main frame; means to raise the load frame to and maintain the same in said unloading positions; a first pairs of wheels disposed laterally outboard of the load frame and adjacent and supporting the rear end of the load frame off the ground when the load frame is in its unloading position; and a second pair of wheels disposed laterally outboard of the main and load frames and adjacent the rear end of the main frame, one pair of said wheels being disposed off the ground when the transporter-unloader is unloaded and in its bale transport position, the other pair of said wheels engaging the ground when the transporter-unloader is loaded or unloaded and in its bale transport position, the load frame being adapted to receive and position the hay bales sequentially therealong with their axes disposed generally lengthwise of the load frame and to permit the hay bales to slide sequentially off the rear end of the load frame onto the ground when in its bale unloading position as the transporter-unloader is moved forwardly.

2. The transporter-unloader of claim 1 wherein the first pair of wheels are disposed off the ground when the transporter-unloader is unloaded and in its bale transport position.

3. The transporter-unloader of claim 2 wherein the second pair of wheels is spring biased relative to the main frame effective so that when the transporter-unloader is in its bale transport position the first pair of wheels are disposed off the ground when the transporter-unloader is unloaded but engage the ground when the transporter-unloader is loaded.

4. The transporter-unloader of claim 3 wherein the load frame includes a pair of laterally spaced bale supporting members extending longitudinally of the load frame.

5. The transporter-unloader of claim 1, 2, 3 or 4 wherein the raising and maintaining means for the load frame comprises a hydraulic hoist of the scissors type interconnecting the main frame and said forward portion of the load frame.

* * * * *